(Model.) 2 Sheets—Sheet 2.
C. LOVELAND.
MACHINE FOR DRESSING SAW TEETH.
No. 321,617. Patented July 7, 1885.
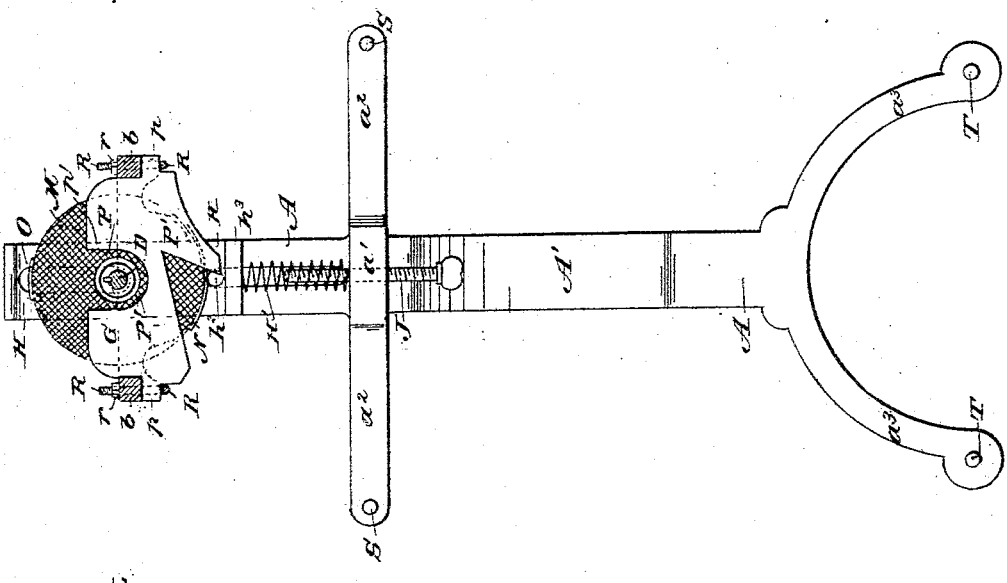
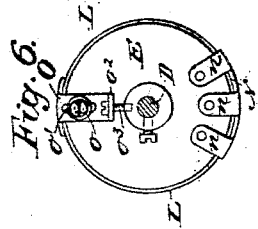
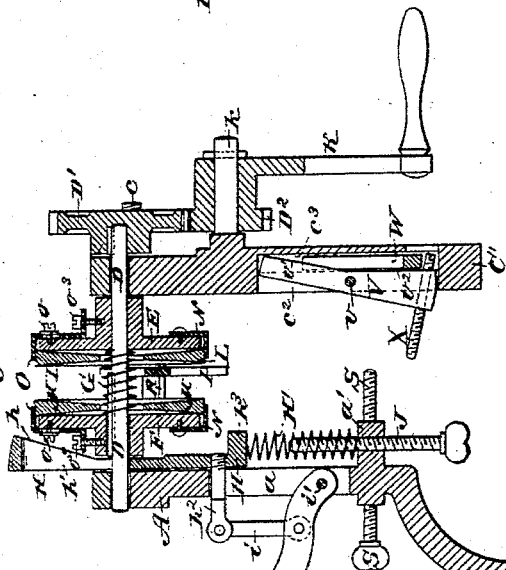
WITNESSES:
INVENTOR:
C. Loveland
BY Munn &
ATTORNEYS.

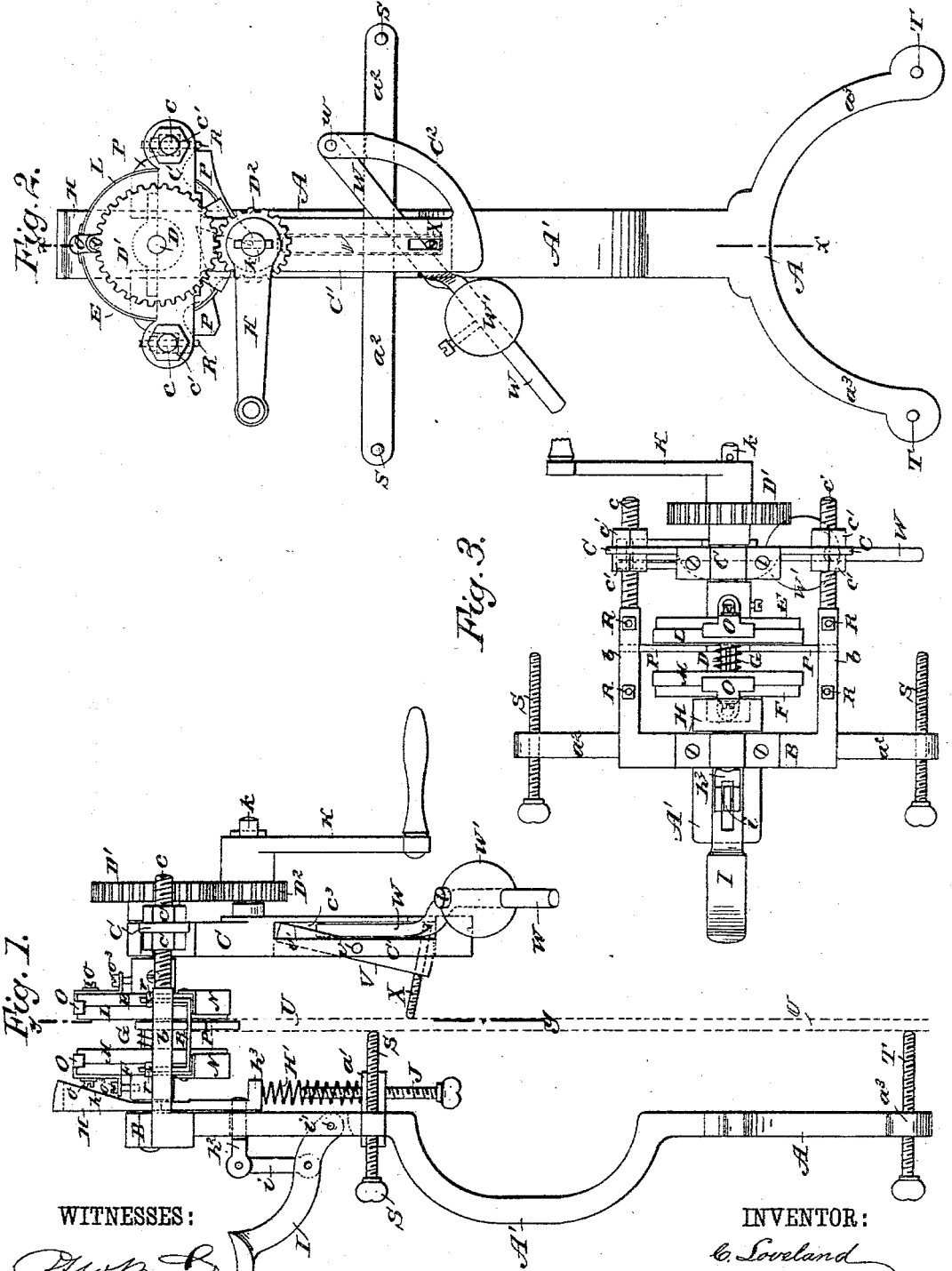

UNITED STATES PATENT OFFICE.

CALVIN LOVELAND, OF SPENCER, WISCONSIN, ASSIGNOR TO HIMSELF AND FRANK WHIPPLE, OF SAME PLACE.

MACHINE FOR DRESSING SAW-TEETH.

SPECIFICATION forming part of Letters Patent No. 321,617, dated July 7, 1885.

Application filed May 8, 1885. (Model.)

*To all whom it may concern:*

Be it known that I, CALVIN LOVELAND, of Spencer, in the county of Marathon and State of Wisconsin, have invented certain new and useful Improvements in Double-Acting Rotary Filing-Machines, of which the following is a full, clear, and exact description.

The object of my invention is to economize time and labor in dressing the swaged teeth of circular or other saws and to improve the cutting qualities and capacity of the saws by securing a uniform width and back bevel to the opposite side edges or faces of the swaged teeth.

The invention consists in a double-acting rotary filing-machine, comprising relatively fixed and movable concaved files mounted facing each other on a rotatable shaft, and means for shifting the movable file along the shaft toward the fixed file for action on both faces or sides of the swaged saw-teeth at once.

The invention consists, also, in particular constructions and combinations of parts of the filing-machine, all as hereinafter fully described and claimed.

Reference is to be had to the accompanying drawings, forming part of this specification, in which similar letters of reference indicate corresponding parts in all the figures.

Figure 1 is a front elevation of my improved filing-machine. Fig. 2 is a side elevation thereof. Fig. 3 is a plan view thereof. Fig. 4 is a vertical sectional elevation of the machine, taken on the line $x\ x$, Fig. 2. Fig. 5 is a side elevation in section on the line $y\ y$, Fig. 1. Fig. 6 is an outside face view of one of the file-holding heads, and Fig. 7 is a perspective view of the wedge-block by which the movable file is shifted.

The frame of the machine comprises a main portion, A, a head portion, B, which may be cast with or attached to part A, and a side portion, C, held parallel with part A upon bolt ends or screws $c\ c$, fixed to the opposite side arms or parts, $b\ b$, of head B by nuts $c'\ c'$, run onto the screws $c\ c$, so as to stand at opposite faces of the head of part C. (See Figs. 1 and 3.)

In suitable boxes on the parts B C of the frame is journaled a transverse shaft, D, on which is held, so as to rotate with the shaft, the relatively-fixed file-holding head E, and also the file-holding head F, which faces the head E, and is splined to the shaft, so as to rotate with it and be movable along it to and from the head E.

A spring, G, placed on the shaft D between the heads E F, normally forces the sliding head F away from head E and toward the part A of the frame, and between the frame and the hub of the head F is placed on the shaft D the block H, which has an inclined face, $h$, next the head F, and is slotted vertically at $h'$, so it may be moved downward on the shaft D, which passes through the slot. The head of block H thus constitutes a wedge, which, when the block is forced downward, presses the head F toward the head E.

To the lower end of block H is screwed or riveted the pin or stud $h^2$, which passes through a slot, $a$, of the frame for a guide to the lower end of block H, and so as to be connected by a link, $i$, with a lever, I, which is pivoted at $i'$ in slot $a$, and has a thumb rest or plate at its outer end. The block H has a flange or shoulder, $h^3$, against which presses the spring H', which is supported on a lug, $a'$, of the frame, and around a screw, J, which is threaded through said lug, so as to form a stop to the downward movement of block H, and consequently to the sliding movement of the file-head F, and by turning the screw J up or down the head F may be stopped at any point of its travel along the shaft D, as the thickness of the saw-teeth being operated on may require. When the pressure on the lever I is relaxed, the spring H' lifts the block H, and the spring G then moves the file-head F away from the saw-tooth, so that the machine may be positioned for action on the next tooth, as presently described.

Rotary motion is imparted to both the file-heads E F by means of a gear-wheel, D', fixed to shaft D, meshing with a pinion, D², formed on or fixed to the hub or collar of a hand-crank, K, which is journaled on a stud, $k$, held to the part C of the machine-frame.

The letters L M indicate the circular files, which are fitted, respectively, to the opposite heads, E F, and held to the heads by means of a segmental clamp-plate, N, attached by screws passing through its bent lugs $n$ into the outer face of the head, and a clamp-plate, O, held to the head diametrically opposite the clamp-plate N by means of a screw, $o$, passing through a washer and through a slot, $o'$, of plate O into the back face of the head, and the plate O has a flange, $o^2$, through which a screw, $o^3$, passes into the hub of the head. When the files are placed against the heads between the overlapping flanges of the clamp-plates, the screw $o^3$ of plate O is tightened to clamp the file tightly between the flanges of the plates N and O, and the screw $o$ may then be tightened. The faces of the files L M are made concaved or beveling inward toward their central portions, which, preferably, are cut away to allow the ends of the spring G to bear directly on the file-heads. The concavity or bevel of the acting faces of the files L M from their periphery to their centers will correspond with the angle to which the opposite faces or sides of the swaged saw-teeth are to be dressed, and each file may have cutting-faces at opposite sides, having the same or different bevels or concavities, so that both sides or faces of the files may be utilized in dressing the saw-teeth to any desired angle each way from the cutting-edges of the teeth for the best clearance of the teeth when the saw is at work.

The letter P indicates the gage-bar, which, preferably, is made of copper, and is fitted between the opposite side bars, $b\ b$, of the frame, and has tongues $p\ p$ extending beneath the bars, so that the U-shaped clips R, which pass through the bars $b$, may be drawn tightly to the tongues by nuts $r\ r$ on each clip, for holding the gage-bar to place across the head of the frame and between the files L M, and as closely as may be to the file L.

The gage-bar is notched at $p'$ to give space for shaft D and spring G, and has a notch, P', into which the successive teeth of the saw enter for positioning the files properly on the teeth.

Screws S S are threaded into the ends of the arms $a^2$ of the frame, and screws T T are threaded into the ends of the lower arms, $a^3$, of the frame, which screws S T may be adjusted in or out, so as to bear by their inner ends against one face of the saw-plate U, as indicated in dotted lines, while the saw is on its mandrel or is held in a suitable clamp or support, thus allowing the files L M to be set parallel with the faces of the saw-plate.

The set-screws S T would alone make a correct gage to adjust the machine against and on the saw-blade; but to insure correct adjustment, and also to make the machine to some extent clamp itself to the saw, I have pivoted at $v$ in a slot, $c^2$, of the pendent arm C' of part C of the frame, a rock-plate, V, having opposite faces, $v'\ v^2$, obtusely inclined outward from the pivot $v$, so as alternately to lie in the path of an arm or lever, W, which is pivoted at $w$ to an arm, $C^2$, of the frame, and passes through a slot, $c^3$, in arm C'.

Into the lower end of rock-plate V is threaded a screw, X, which will be swung against the saw-plate U, when the lever W is carried down by gravity or by a weight, W', placed on it, the lever then acting against the inclined face $v^2$ of the plate V, and when the lever W is raised the screw X will fall back from the saw-plate, or may be moved back by contact of the lever W with the face $v'$ of plate V.

The operation is as follows: After the saw-teeth have been swaged to give them an approximately correct set to both sides of the saw plate or blade, the filing-machine will be tried on the teeth, and its file L will be set in the most advantageous position for action on the blade by shifting the part C of the frame in or out by means of the double nuts $c'\ c'$ on the screws $c\ c$, and when the teeth of the saw stand in proper relation to the file L the screws S T will be set against the saw-plate, and the screw X will be properly adjusted in the plate V, so that the weighted lever will carry said screw X against the opposite face of the saw-plate, thereby clamping the machine to the saw, and the screw J will be set to stop the file M at the proper place.

When the machine is properly adjusted, the hand-grasp A', formed by a bend in part A of the frame, will be seized by the left hand, the notch P' of gage P set on each successive saw-tooth, and the lever I pressed down by the thumb of the left hand to lower the block H and press the file M to the saw. By giving a few turns to the crank K by the right hand, both sides of each successive tooth of the saw will be dressed at once and alike by the files L M at precisely the same angle and at equal distance from the saw-plate, so that the extreme cutting-edges of the teeth will be of like width, causing the saw-teeth to run truly through the lumber, leaving the faces of the lumber quite smooth and perfect, and as each tooth of the saw will do its full share of the work, the cutting capacity of the saw will largely be increased, and time and power will be economized in using the saw.

My improved machine will operate equally well on the teeth of straight or circular saws used for cutting any kind of material.

Having thus described my invention, what I claim as new, and desire to secure by Letters Patent, is—

1. A double-acting rotary filing-machine, comprising relatively fixed and movable concaved files mounted facing each other on a rotatable shaft, and means for shifting the movable file along the shaft toward the fixed file for dressing both sides of the saw-teeth or work at once, substantially as herein set forth.

2. In a filing-machine, the combination of the frame A B C, shaft D, file-head and file E L, fixed thereto, file-head and file F M, splined to the shaft, spring G, block H, having inclined face $h$, means, substantially as described, for depressing the block, a spring for lifting the block, and the gage-screw J, substantially as herein set forth.

3. The combination of the frame A B C, shaft D, fast and loose rotatable files L M, spring G, gage P, notched at P', block H, having inclined face $h$, means, substantially as described, for depressing the block, a spring for lifting the block, and a gage-screw, J, substantially as herein set forth.

4. The combination, with the frame A B C, shaft D, gage P, notched at P', and the rotatable file L, of the screws $c$ $c$ and nuts $c'$ $c'$, substantially as herein set forth.

5. The combination of the frame A B C, shaft D, fast and loose rotatable files L M, block H, having inclined face $h$, the stud $h^2$, link $i$, lever I, spring H, and stop-screw J, substantially as herein set forth.

6. The combination, with the frame A B C, shaft D, fast and loose rotatable files L M, and gage P, notched at P', of the gage-screws S T, fitted in the frame, substantially as herein set forth.

7. The combination, with the frame A B C, shaft D, fast and loose rotatable files L M, and gage P, notched at P', of the gage-screws S T, and the clamp-screw X, fitted in a pivoted plate, V, and the lever W, substantially as herein set forth.

8. The combination, with the frame, the shaft D, and files L M, of the gage P, provided with a notch, P', and held to the arms $b$ $b$ of the frame by clips R $r$, substantially as herein set forth.

9. The rotatable file holder and clamp, comprising a head and clips N O, held thereto, and said clip O provided with a slot, $o'$, and flange $o^2$, and secured to the head by screws $o$ $o^3$, substantially as herein set forth.

10. In a saw-filing machine, consisting of a frame, A B C, shaft D, files L M, wedge-block H, and devices, substantially as described, for operating said machine, the portion A of said frame provided with a hand-grasp, A', adjacent to the depressing-lever, I, of block H, whereby the machine can be conveniently held, adjusted, and operated, as set forth.

CALVIN LOVELAND.

Witnesses:
T. O. THOMPSON,
A. LARSEN.